US006200491B1

(12) United States Patent
Zesch et al.

(10) Patent No.: US 6,200,491 B1
(45) Date of Patent: Mar. 13, 2001

(54) FABRICATION PROCESS FOR ACOUSTIC LENS ARRAY FOR USE IN INK PRINTING

(75) Inventors: James C. Zesch, Santa Cruz; Calvin F. Quate, Stanford, both of CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/274,846

(22) Filed: Mar. 23, 1999

(51) Int. Cl.[7] .............................. G01D 15/16; B41J 2/04

(52) U.S. Cl. ................................ 216/27; 216/24; 216/26; 216/52

(58) Field of Search ................................ 216/27, 52, 24, 216/26

(56) References Cited

U.S. PATENT DOCUMENTS

| | | | |
|---|---|---|---|
| 4,601,778 | 7/1986 | Robb | 438/513 |
| 4,689,291 | 8/1987 | Popovic et al. | 430/321 |
| 4,737,447 | 4/1988 | Suzuki et al. | 430/321 |
| 4,751,529 | 6/1988 | Elrod et al. | 347/46 |
| 4,751,530 | 6/1988 | Elrod et al. | 347/46 |
| 4,751,534 | 6/1988 | Elrod et al. | 347/46 |
| 5,041,849 | 8/1991 | Quate et al. | 347/46 |
| 5,278,028 | 1/1994 | Hadimioglu et al. | 430/321 |
| 5,298,366 | 3/1994 | Iwasaki et al. | 430/321 |
| 5,300,263 | 4/1994 | Hoopman et al. | 264/2.5 |
| 5,415,718 | 5/1995 | Ohmi et al. | 156/345 |
| 5,605,598 | 2/1997 | Greiff | 438/50 |
| 5,665,203 | 9/1997 | Lee et al. | 438/585 |
| 5,719,073 | 2/1998 | Shaw et al. | 438/53 |
| 5,821,958 * | 10/1998 | Lim | 347/46 |
| 6,036,874 * | 3/2000 | Farnaam | 216/27 |

OTHER PUBLICATIONS

Replication and Molding of Optical Components, Riedl et al. (Technical Conferences, Conf. 896, SPIE Proceedings vol. 896) Jan., 1988.

Technology Trends, Finished Lens Molding Saves Time and Money, Aquilina et al., (Photonics Spectra, Sep. 1986).

Precision Glass Microlens Array by a Photo–Thermal Technique, Bellman et al. (SPIE vol. 896 Replication and Molding of Optical Components, Jan. 1988).

Replication and Molding of Optical Components (vol. 896) Session 4, Molded Glass Lenses, Pollicove, Harvey M., Eastman Kodak Company, Jan. 1988.

Micron–Size Optical Waveguide for Optoelectronic Integrated Circuits, Nagata et al., (Extended Abstracts of the 1993 Intl. Conference on Solid State Devices and Materials, Makuhari, Jan. 1993, pp. 1047–1049).

Technique for Monolithic Fabrication of Microlens Arrays, Popovic et al., (Applied Optics, vol. 27, No. 7, Apr. 1988).

* cited by examiner

*Primary Examiner*—Randy Gulakowski
*Assistant Examiner*—Shamim Ahmed
(74) *Attorney, Agent, or Firm*—Fay, Sharpe, Fagan, Minnich & McKee, LLP

(57) ABSTRACT

An acoustic lens array fabrication process includes the formation of a microlens array mold stamper through the melting of a photoresist resin deposited on formed pedestals of a substrate. Heating of the resin causes formation of semi-spherical photoresist mounds. A further processing step, such as reactive ion etching, is used to transfer the geometry of the photoresist mounds to the substrate material, thereby forming a microlens mold stamper with convex mounds. The microlens mold stamper is then pressed into an upper surface of a acoustic ink print head substrate heated to a predetermined temperature, allowing the convex mounds to form concave impressions in the acoustic ink print head substrate, thereby forming the microlens array.

20 Claims, 4 Drawing Sheets

FIG. 1
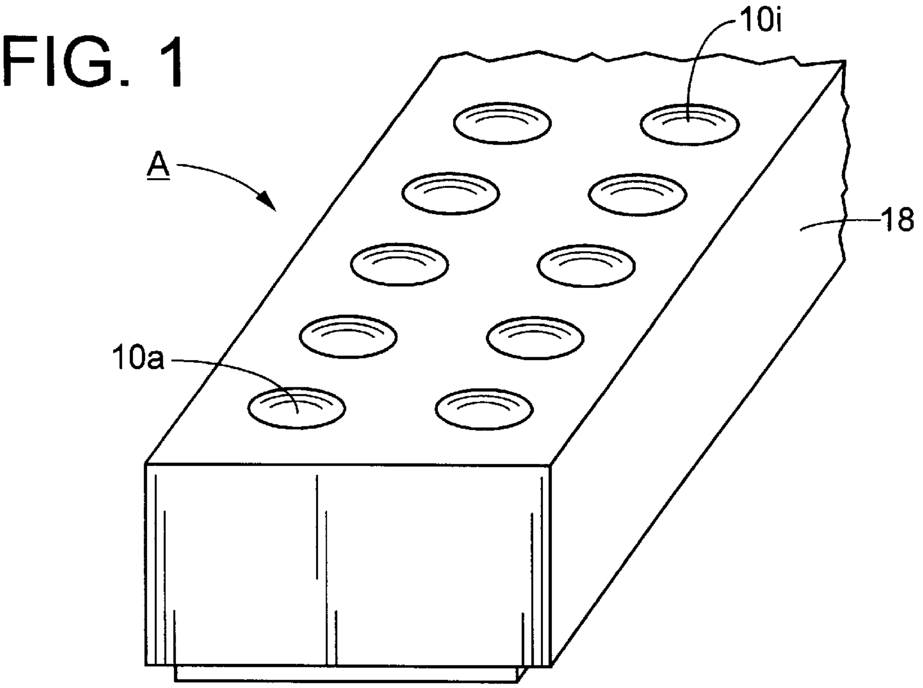
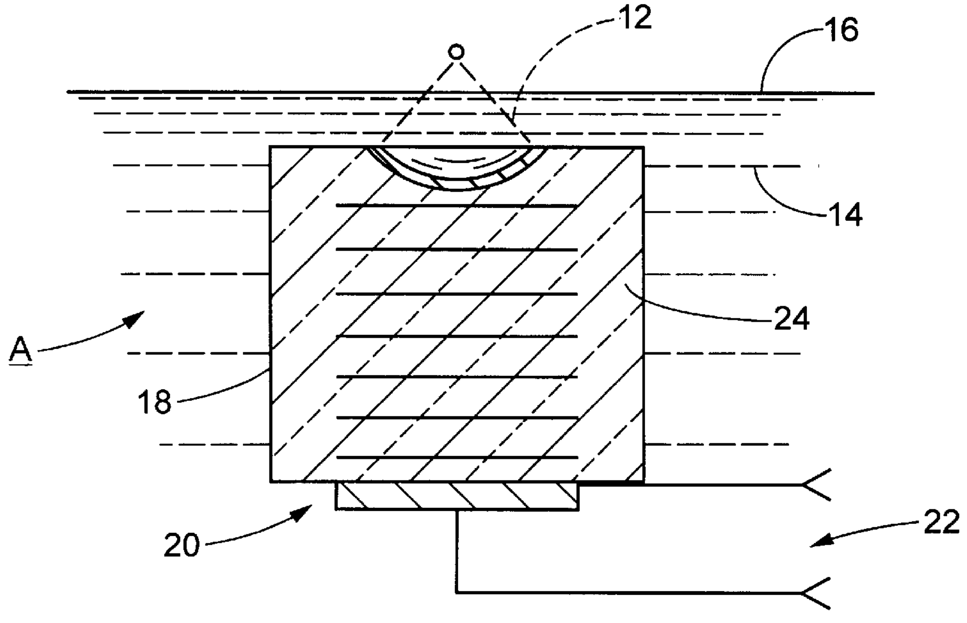
FIG. 2

FABRICATION PROCESS FOR ACOUSTIC LENS ARRAY FOR USE IN INK PRINTING

BACKGROUND OF THE INVENTION

This invention relates to the fabrication of microlenses and, more particularly, to a process for monolithically manufacturing them as fully integrated components of acoustic ink print heads and the like. Even more specifically, the present invention pertains to a reliable and repeatable process for applying existing semiconductor fabrication technology to the manufacture of microlenses and microlens arrays, thereby facilitating the production for use as part of acoustic ink print heads.

Acoustic ink printing is a promising direct marking technology. It is an attractive alternative to ink jet printing because it has the important advantage of obviating the need for the nozzles and small ejection orifices that have caused many of the reliability and picture element (i.e., "pixel") placement accuracy problems which conventional drop on demand and continuous stream ink jet printers have experienced.

As will be appreciated, the elimination of the clogged nozzles is especially relevant to the reliability of large arrays of ink emitters, such as page width arrays comprising several thousand separate emitters. Furthermore, small ejection orifices are avoided, so acoustic printing can be performed with a greater variety of inks than conventional ink jet printing, including inks having higher viscosities and inks containing pigments and other particulate components.

As is known, an acoustic beam exerts a radiation pressure against objects upon which it impinges. Consequently, when an acoustic beam impinges on a free surface (i.e., liquid/air interface) of a pool of liquid from beneath, the radiation pressure which the beam exerts against the free surface may reach a sufficiently high level to release individual droplets of liquid from the surface of the pool, despite the restraining force of surface tension. To accomplish this, the acoustic beam is brought to focus on or near the surface of the pool, thereby intensifying its radiation pressure for a given amount of input power. These principles have been applied to acoustic printing previously, using ultrasonic (rf) acoustic beams to release small droplets of ink from ink pools.

Prior work has demonstrated that acoustic ink printers having droplet emitters composed of acoustically illuminated spherical focusing lenses can print precisely positioned pixels at a sufficient resolution for high quality printing of relatively complex images. See, for example, commonly assigned U.S. Pat. No. 4,751,529 on "Microlenses for Acoustic Printing", and U.S. Pat. No. 4,751,530 on "Acoustic Lens Array for Ink Printing", to Elrod et al. which are both hereby incorporated by reference.

Acoustic ink printing requires precise positioning of the lenses with respect to each other on very closely spaced centers. In a known manufacturing process the lenses are chemically etched or molded into the substrate. A photolithographic process for isotropically etching them into silicon is described by K. D. Wise et al, "Fabrication of Hemispherical Structures Using Semiconductor Technology for Use in Thermonuclear Fusion Research," *J. Vac. Sci. Technol.*, Vol 16, No. 3, May/June 1979, pp. 936–939 and that process may be extended to fabricating lenses and substrates composed of other chemically etchable materials. Alternatively, it has been suggested the lenses may be cast into materials such as alumina, silicon nitride and silicon carbide through the use of hot press or injection molding processes. However, etching of the spherical lenses into a substrate has been found to be a complex procedure which has not achieved the high reliability and through-put necessary for commercial manufacturing. Furthermore, it has been found that the process of etching the cavities produces some variability in the radius of curvature of the lenses, and in turn this introduces some variability in the size of the ejected droplets. This degrades the quality of the printing. In addition, while hot press and injection molding processes have been suggested, they also have not been shown to provide the necessary reliability and through-put which is necessary.

Therefore, there exists a drawback to the manufacture of acoustic ink printers implementing spherical focusing lenses, due to the difficulty of manufacturing arrays having a high number of spherical lenses. Particularly, an acoustic ink print head will commonly have over a thousand individual ink emitters wherein each emitter has a corresponding lens. It has, therefore, been a further problem to develop a manufacturing process where such arrays can be reliably manufactured to tight tolerances in large numbers.

In view of the foregoing, it has been deemed desirable to develop a manufacturing process which allows for the configuration of microlens arrays for use in acoustic ink print heads, and to develop a process for economically producing such arrays.

SUMMARY OF THE INVENTION

The present invention is directed to a manufacturing process for producing microlens arrays by first forming a microlens array mold stamper. The process includes forming individual isolated pedestals on a substrate having a high melt resistance. Deposited on each of the pedestals are selected amounts of photoresist, which are melted at predetermined temperatures whereby the photoresist takes on a spherical form. An etching process, such as reactive ion etching (RIE), is used to transfer the geometric shape of the spherical photoresist into the substrate having the high melt resistance. This process results in a microlens array mold stamper having convex spherical mounds corresponding to lens positions of a microlens array. Next, the microlens array mold stamper is brought into contact with a front surface of a heated glass substrate which is to be part of the acoustic ink print head. Impingement of the stamper creates concave indentations within the glass substrate which forms a microlens array in the substrate.

It is therefore an object of the present invention to provide an economical, highly reproducible manufacturing process for the manufacture of microlens arrays which may be used in an acoustic ink print head.

Another object of the present invention is to a method of forming microlens arrays directly into the glass substrate of the acoustic ink printer such that alignment problems found in previous print heads is avoided.

Yet another object of the present invention is to avoid problems which occur due to the need to connect the microlenses to the acoustic ink print head.

These together with other objects of the invention, along with the various features of novelty which characterize the invention are pointed out with particularity in the attached claims which form a part of this disclosure. For a better understanding of the invention, its operating advantages and the specific objects obtained by its uses, reference should be made to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the drawings wherein:

FIG. 1 is an isometric view of an acoustic print head constructed in accordance with the present invention;

FIG. 2 is a cross-sectional view of a portion of the print head shown in FIG. 1, with the print head being submerged in a pool of ink for operation;

DETAILED DESCRIPTION OF THE PREFERRED EMBODIMENTS

Figure 3A:
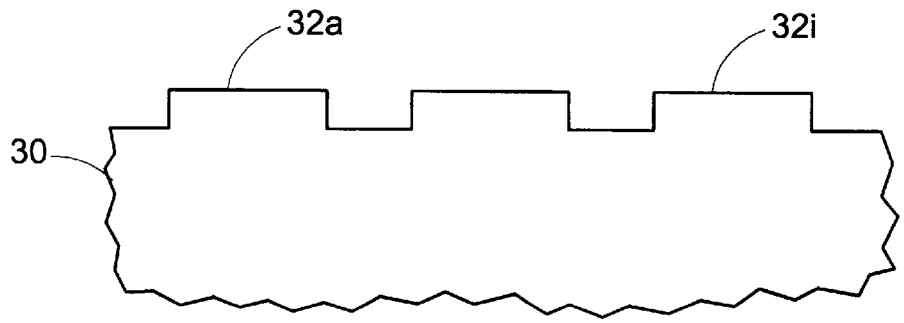
FIG. 3A depicts a photolithographically patterned substrate of the mold stamper.

While the invention is described in some detail hereinbelow with reference to certain illustrated embodiments, it is to be understood that there is no intent to limit it to those embodiments. On the contrary, the aim is to cover all modifications, alternatives and equivalents falling within the spirit and scope of the invention as defined by the appended claims.

Turning now to the drawings, and at this point especially to FIGS. 1 and 2, there is a partial view of an acoustic print head A comprising an array of precisely positioned spherical acoustic lenses 10*a*–10*i* for launching a plurality of converging acoustic beams 12 into a pool of ink 14 (shown only in FIG. 2). Each of the acoustic beams 12 converges essentially symmetrically relative to the center of the lens 10*a* . . . , or 10*i* from which it originates, and the focal lengths of the lenses 10*a*–10*i* are selected so that each of beams 12 come to focus at or near the free surface (i.e., the liquid/air interface) 16 of the pool of ink 14. Suitably, print head A is submerged in ink 14. Alternatively, lenses 10*a*–10*i* may be coupled thereto by a low acoustic loss medium, such as via a thin film of Mylar or the like (not shown).

The acoustic lenses 10*a*–10*i* are defined by small, generally spherically shaped indentions which are formed in the upper surface of a solid substrate 18. A piezoelectric transducer 20 is deposited on or otherwise maintained in intimate mechanical contact with the opposite or lower surface of substrate 18, and a suitable rf source 22 is coupled across transducer 20 to excite it into oscillation. The oscillation of transducer 20 causes it to generate ultrasonic acoustic waves 24 for collectively or separately illuminating lenses 10*a*–10*i*. The acoustic wave 24 which illuminates some or all of lenses 10*a*–10*i*, is selected to cause beams 12 to excite the free surface 16 of ink 14 to an incipient, sub-threshold energy level for droplet formation.

As illustrated in FIGS. 1 and 2 transducer 20 has a planar profile, so it generates generally planar wavefront acoustic waves 24. However, transducers having other profiles may be employed. For example a cylindrical transducer (not shown) may be employed for generating partially prefocused acoustic waves to illuminate a linear array of lenses.

To significantly reduce, if not eliminate, aberrations of the focused acoustic beams 12, substrate 18 is composed of a material having an acoustic velocity, $v_s$, (i.e., the velocity of sound in substrate 18) which is much higher than the velocity of sound in ink 14 $v_i$, so that $v_s > v_i$. Typically, the velocity of sound in ink 14, $v_i$, is in the range of 1–2 km/sec. Thus, substrate 18 may be composed of any one of a wide variety of materials, such as silicon, silicon nitride, silicon carbide, alumina, sapphire, fused quartz, and certain glasses, to maintain a refractive index ratio (as determined by the ratio of the acoustic velocities, $v_s/v_i$) in excess of 2.5:1 at the interface between the lenses 10*a*–10*i* and ink 14. A 2.5:1 ratio is sufficient to ensure that aberrations of beams 12 are small. However, if substrate 18 is composed of one of the higher acoustic velocity materials, such as silicon, silicon nitride, silicon carbide, alumina and sapphire, a refractive index ratio of 4:1 or higher can be easily achieved, thereby reducing the aberrations of beams 12 to an essentially negligible level. See, C. F Quate, "The Acoustic Microscope" *Scientific American*, Vol. 241, No. 4 October 1979, pp 62–72 for a more detailed discussion of the principles involved.

Typically, the radii of lenses 10*a*–10*i* are greater than the depth of the indentations which define them so that their focal plane is offset from the upper surface of substrate 18 by a distance which is approximately equal to the thickness of the overlying layer of ink 14 (plus the thickness of any intervening medium, such as any film that is used to support the ink).

Linear and two dimensional lens arrays (as used herein a "two dimensional array" means an array having two or more rows of lenses) for various types of acoustic printing may be provided in accordance with this invention, including page width linear and two dimensional lens arrays for line printing, smaller linear arrays for multi-line raster printing, and two dimensional arrays for matrix printing.

In accordance with the present invention, a process is provided for monolithically manufacturing microlens arrays, such as microlens array 10*a*–10*i*, to exacting optical specifications on opto-electronic devices, such as substrate 18 of acoustic ink print head A.

Referring to FIGS. 3A–3E, in keeping with this invention, the steps in the formation of a microlens array mold stamper are set out. Initially, mold stamper substrate 30, which may be one of various materials having the characteristics of high temperature resistance and formability and among which may include polysilcon, is photolithographically patterned, as shown in FIG. 3A, to form sharp-edged cylindrical pedestals 32*a*–32*i* having a diameter of from 10 s of microns to several 100 s of microns (e.g. 30–300 microns), using known techniques. Advantageously, the height of the pedestals 32*a*–32*i*, which usually is on the order of one micron or so in this embodiment, is greater than the maximum radius of curvature of their upper edges for reasons that will be described hereinbelow.

Figure 3B:
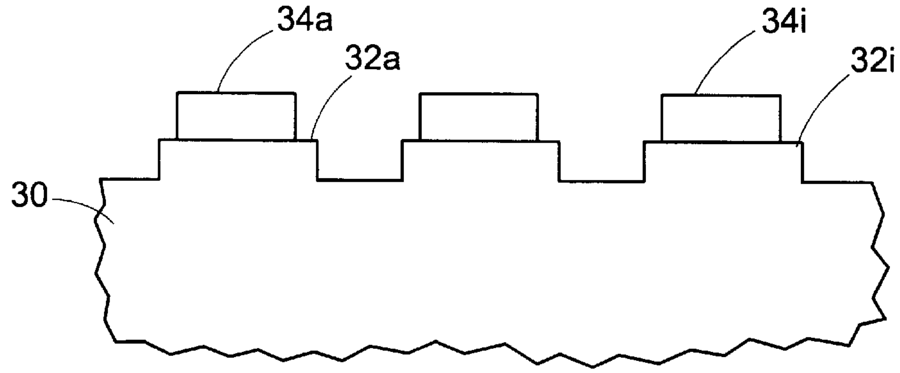
FIG. 3B depicts cylinders centered on pedestals of the mold stamper substrate.

Next, as shown in FIG. 3B, a layer of resin based positive photoresist, such as for example Shipley TF-20 photoresist, is deposited by spin coating, suitably at 2000 rpm for 45 seconds to obtain a coating thickness or height of roughly 15 microns in this embodiment. Due to the relatively thick coating that is desired, the coating process preferably is carried out in two steps, so that the initial coating can be softbaked at about 90° C., for approximately 10 minutes before applying the second coating which, in turn, is softbaked for about 30 minutes.

Upon completion of the coating process, the second photoresist layer is photolithographically patterned, so that all that remains of it are cylinders 34*a*–34*i* which are centered on pedestals 32_a_–32_i_, respectively, and which have diameters (e.g. 25–250 microns) smaller than the pedestals. It should, however, be understood that the geometrical positioning of cylinders 34_a_–34_i_ is not especially critical, provided that there is an adequate tolerance between their outer circumferences and the upper edges of pedestals 32_a_–32_i_ to prevent the formation of unwanted drip paths that would allow the second layer of resin to spill over the pedestal edges. Likewise, it should be noted that the configuration of cylinders 34_a_–34_i_ is merely a convenient mechanism for ensuring that they all contain substantially the same volume of material. As described hereinbelow, the volume of the resin layer that resides on pedestals 32_a_–32_i_ will determine the radii of lenses 10_a_–10_i_, respectively, so equal volumes of material are provided to ensure that lenses 10_a_–10_i_ are essentially identical.

Figure 3C:
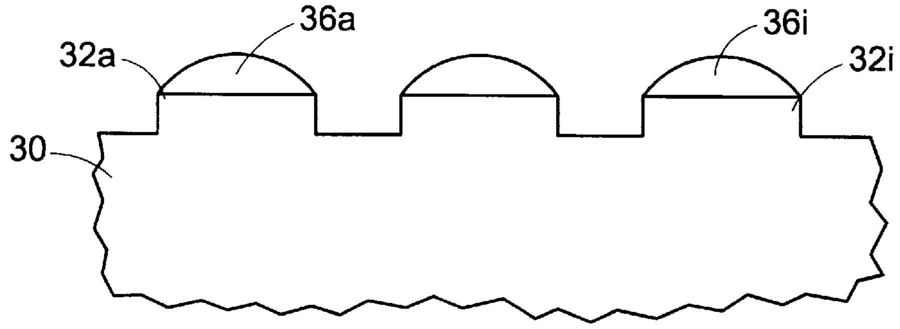
FIG. 3C depicts semi-spherical photoresist mounds formed on the substrate.

More particularly, to the steps of forming the microlens mold stamper, the patterned layer of resin (i.e., cylinders 34_a_–34_i_) is flood exposed to near U.V. radiation, thereby reducing its melting temperature, and it is then heated to approximately 14° C. for about 15 minutes, thereby causing it to melt. As shown in FIG. 3C, the molten resin wets the hardened pedestals 32_a_–32_i_ so it spreads laterally across the pedestal surface, but the sharp edges of pedestals 32_a_–32_i_ effectively confine the flow, thereby is preventing the molten resin from spreading there beyond the edges of the pedestal. Typically, the volume of resin that is deposited on top of any one of pedestals 32_a_–32_i_ is limited to be no greater than approximately $2\pi r^3/3$, where r is the radius of pedestals 32_a_–32_i_. This is an adequate amount of material for forming semi-spherical photoresist mounds 36_a_–36_i_.

Lesser amounts of material may be employed to produce photoresist mounds 36_a_–36_i_ having partial semi-spherical configurations, so it will be useful to more generally define the volume of the resin layer/pedestal as an "equilibrium volume." That means the volume of material is sufficiently small so that it reaches a equilibrium state while being fully confined by the pedestal edges. See, J. F. Oliver et al., "Resistance to Spreading of Liquids by Sharp Edges," *Journal of Colloid and Interface Science*, Vol. 59, No. 3, May 1977, pp. 568–81. Effective confinement of the molten resin is ensured if the height of pedestals 32_a_–328 is greater than maximum radius of curvature of their edges because that relationship satisfies all possible contact angles the molten resin may exhibit with respect to the upper surfaces of pedestals 32_a_–32_i_. Sharp edge drop off from the upper surfaces of pedestals 32_a_–32_i_ are desired, but the degree of edge sharpness that is required is difficult to define with precision. Thus, the foregoing approximation is a useful guideline, especially because it is a conservative definition of the requirement.

The inherent surface tension of the resin layer while it is in its molten state causes photoresist mounds 36_a_–36_i_ to have substantially constant radii, provided that here is no significant gravitational deformation of the photoresist mounds 36_a_–36_i_ while they are cooling and resolidifying. The sharp edges of the pedestals 32_a_–32_i_ limit the flow of the molten photoresist, thereby preventing photoresist mounds 36_a_–36_i_ from merging into one another. Thus, it will be understood that microlens molds which are not semi-spherical may be fabricated in accordance with the teachings of this invention simply by modifying the shape of pedestals 32_a_–32_i_.

Figure 3D:
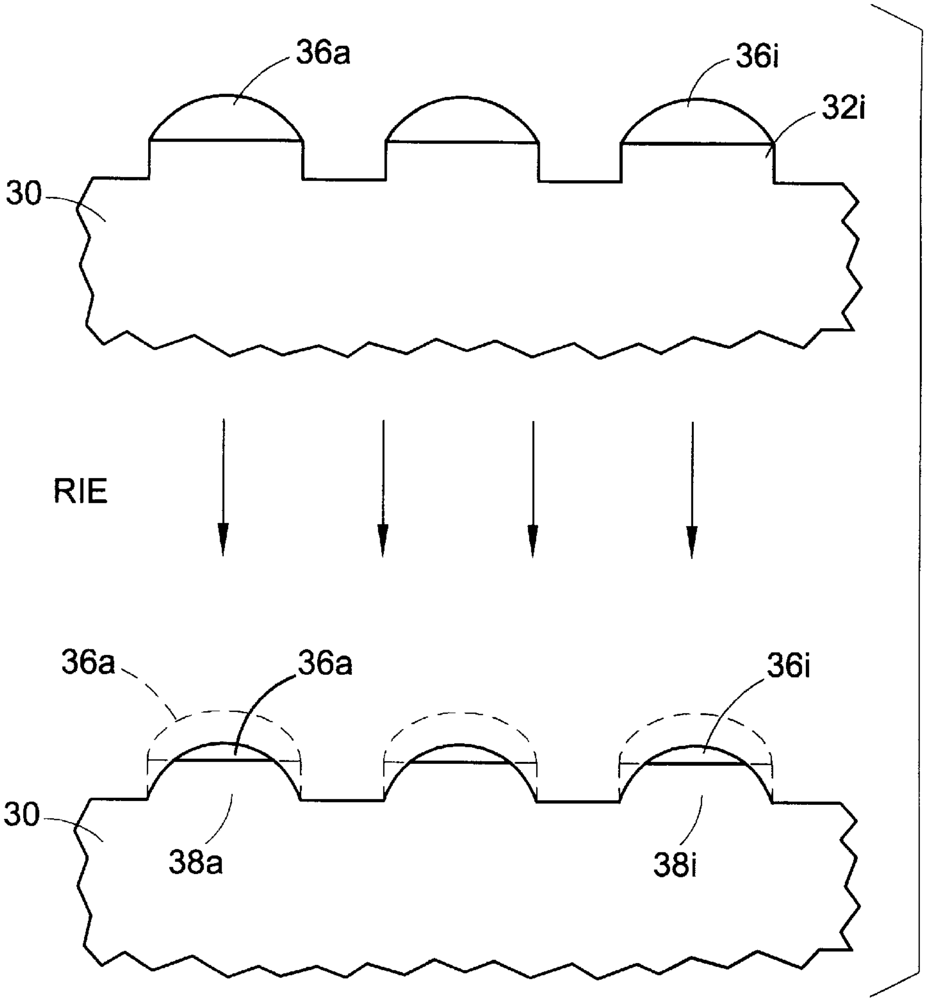
FIG. 3D depicts the photoresist mounds subjected to processing procedures.
Figure 3E:
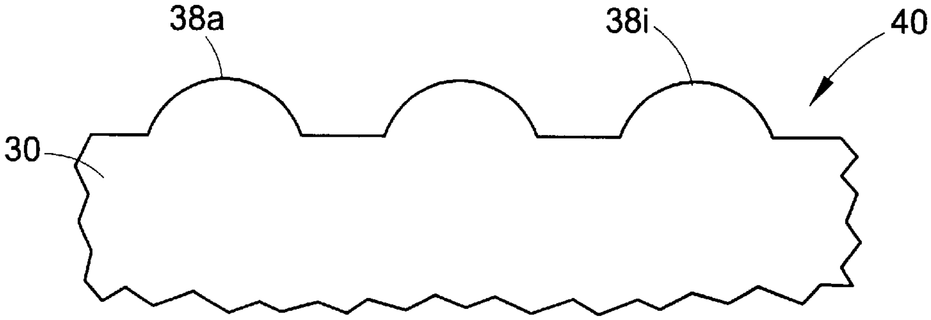
FIG. 3E depicts the formed microlens mold stamper.

Turning attention to FIG. 3D, substrate 30 having photoresist mounds 36_a_–36_i_, is subjected to a further processing procedure, such as reactive ion etching (RIE). The processing in accordance with RIE is undertaken in order to transfer the geometry of photoresist mounds 36_a_–36_i_ into substrate 30. Specifically, by using RIE or other equivalent process, it is possible to form the upper surface of substrate 30 with microlens mold mounds 38_a_–38_i_ which have an inverse geometry of a microlens array such as array 10_a_–10_i_, illustrated in FIG. 1. A microlens mold stamper 40 formed according to the forgoing discussion and having microlens mold mounds 38_a_–38_i_ is illustrated in FIG. 3E. Microlens mold stamper 40 is formed from polysilican or other appropriate material having sufficient strength and heat resistance to be used in repeated molding of lens arrays according to the procedures to be described below.

Figure 4A:
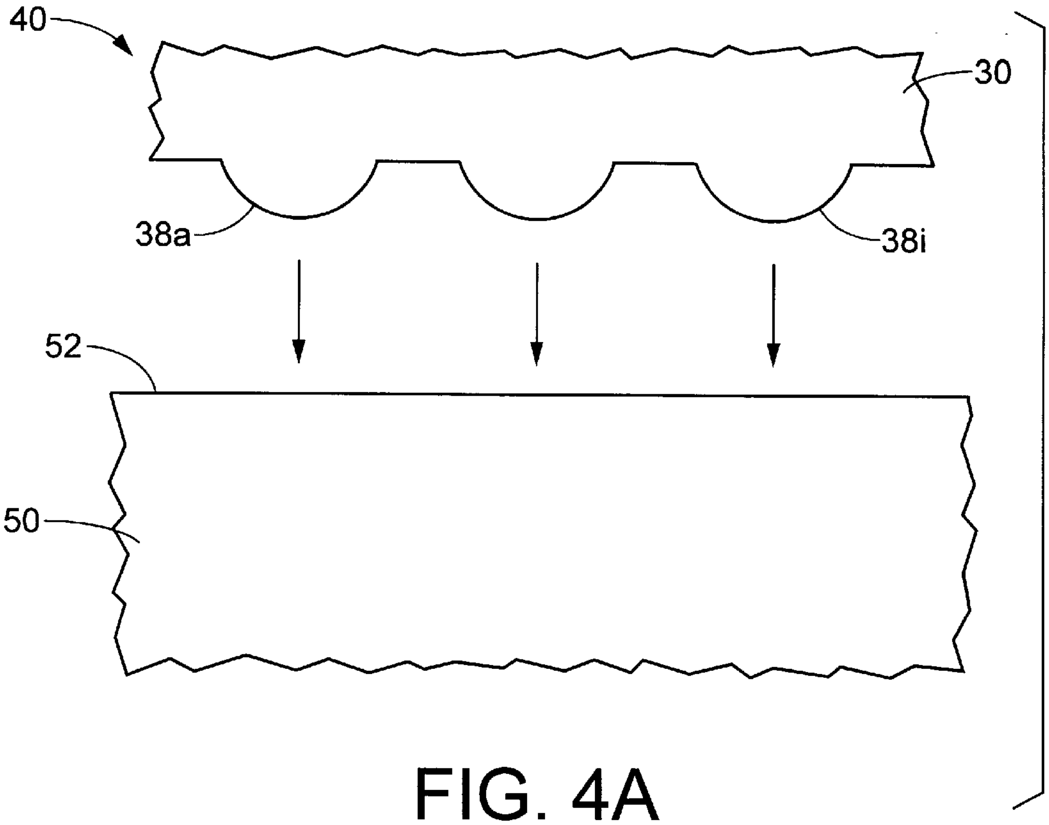
FIG. 4A sets forth an illustration of a heated substrate in association with a microlens mold stamper.

As previously discussed, a substrate, such as substrate 18 of acoustic ink print head A of FIG. 1, in which is formed an acoustic lens array may be comprised of any one of a wide variety of materials, such as silicon, silicon nitride, silicon carbide, alumina, sapphire, fused quartz, and certain glasses. Such a substrate 50 of FIG. 4A is heated until substrate 50 reaches a thermal state that allows for a mold pressing operation. At this time, microlens stamper mold 40, carrying convex mounds 38_a_–38_i_ whose shapes are inverted to the desired lens shapes, is pressed into an upper surface 52 of heated glass substrate 50 along lines 54 to form spherical cavities such as those of microlens array 10_a_–10_i_. Since microlens molds 40 can be prepared with photographic accuracy, the molding process is of sufficient accuracy for the replication of identical lenses.

Figure 4B:
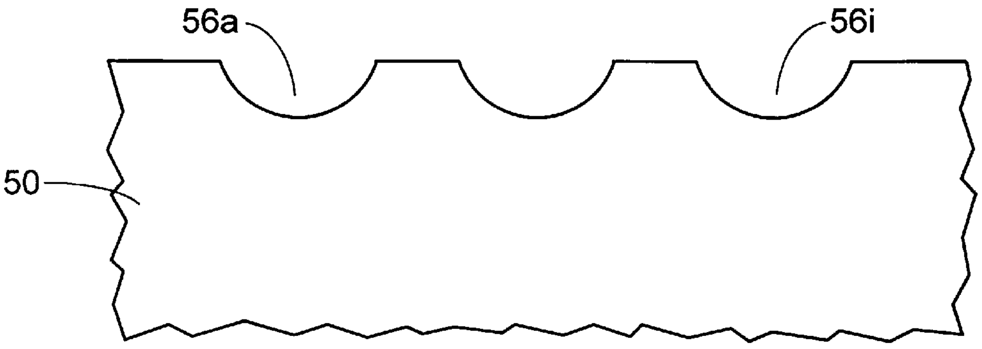
FIG. 4B illustrates a lens array formed by the microlens mold stamper.

When microlens mold stamper 40 is separated from substrate 50, a precisely positioned lens array 56_a_–56_i_ is formed as shown in FIG. 4B. The heating of substrate 50, and the pressing and removal of microlens stamper mold 40 are accomplished by known processing techniques.

In view of the forgoing, it will now be understood that the present invention provides a readily controllable microlens array fabrication process which may be employed to monolithically manufacture microlens arrays on a substrate of an acoustic ink print head. Furthermore, it will be evident that the microlens array manufacturing process of this invention may be carried out using existing semiconductor fabrication technology.

With respect to the above description then, it is to be realized that the optimal dimensional relationships for the parts of the invention, to include variations in size, materials, shape, form, function and manner of operation, assembly and use are deemed readily apparent and obvious to one skilled in the art and all equivalent relations to those illustrated in the drawings and described in the specification are intended to be encompassed by the present invention.

Therefore, the forgoing is considered as illustrative only of the principles of the invention. Further, since numerous modifications and changes will readily occur to those skilled in the art, it is not desired to limit the invention to the exact construction and operation shown and described and accordingly, all suitable modifications and equivalents may be resorted to falling within the scope of the invention.

In consideration thereof, we claim:

1. A method of forming a microlens array for use in an acoustic ink print head, the method comprising the steps of:

forming a mold substrate having a plurality of pedestals on an upper surface of the mold substrate;

depositing predetermined amounts of a photoresist material on the upper surface of the pedestals, wherein the predetermined amount of photoresist material deposited on the pedestals is substantially the same for each pedestal;

melting the photoresist material by a predetermined temperature until semi-spherical photoresist mounds are formed from the deposited photoresist material;

etching the mold substrate in accordance with a pattern of the semi-spherical mounds, whereby the geometry of the semi-spherical mounds is transferred into the mold substrate, forming a microlens array mold stamper;

heating an acoustic ink print head substrate to a temperature which softens the acoustic ink print head substrate to a degree whereby molding of the acoustic ink print head substrate can be achieved;

pressing the microlens array mold stamper into a top surface of the heated acoustic ink print head substrate to thereby form an array of concave indentations corresponding to the semi-spherical mounds of the microlens array mold stamper; and separating the microlens array mold stamper from the upper surface of the acoustic ink print head substrate, whereby a microlens array is formed in the upper surface of the acoustic ink print head substrate.

2. The method according to claim 1 wherein the step of forming the pedestals includes forming pedestals as sharped-edged cylindrical pedestals.

3. The method according to claim 2 wherein the step of depositing further includes providing an amount of photoresist equal to an equilibrium volume, which is an amount of material sufficiently small so that when the melting step takes place, the melted photoresist reaches an equilibrium state while being fully confined by the pedestal edges.

4. The method according to claim 1 wherein the pedestals are formed of a heat resistant material and are hard baked and deep U.V. hardened, to ensure that the pedestals are thermally stable.

5. The method according to claim 1 wherein the step of depositing the photoresist further includes photolithographically patterning the photoresist material, so that all that remains are photoresist cylinders which are centered on the pedestals.

6. The method according to claim 1 wherein the step of forming the pedestals includes forming pedestals which are substantially identical to each other in configuration and size.

7. The method according to claim 1 wherein the step of forming the pedestals includes forming pedestals which are differing from each other in at least one of configuration and size.

8. The method according to claim 1 wherein the step of transferring the geometry of the photoresist mounds into the acoustic ink print head substrate is accomplished by the process of reactive ion etching.

9. The method according to claim 1 wherein the step of forming the mold substrate of the microlens array mold stamper includes using a material having the characteristic of maintaining high heat resistance over a plurality of molding procedures.

10. A method of manufacturing an acoustic ink print head for emitting ink droplets, the method comprising the steps of:

producing a microlens array mold stamper, including, forming a mold substrate having a plurality of pedestals on an upper surface of the mold substrate, depositing predetermined amounts of a photoresist material on the upper surface of the pedestals, wherein the predetermined amount of photoresist material deposited on the pedestals is substantially the same for each pedestal, melting the photoresist material by a predetermined temperature until semi-spherical photoresist mounds are formed from the deposited photoresist material, and etching the mold substrate in accordance with a pattern of the semi-spherical mounds, whereby the geometry of the semi-spherical mounds is transferred into the mold substrate, forming the microlens array mold stamper, forming a microlens array in an acoustic ink print head substrate, including, heating the acoustic ink print head substrate to a temperature which softens the acoustic ink print head substrate to a degree whereby molding of the acoustic ink print head substrate can be achieved, pressing the microlens array mold stamper onto a top surface of the heated acoustic ink print head substrate to thereby form an array of concave indentations corresponding to the semi-spherical mounds of the microlens array mold stamper, and separating the microlens array mold stamper from the upper surface of the acoustic ink print head substrate, whereby a microlens array is formed in the upper surface of the acoustic ink print head substrate;

forming a pool of ink within which at least a portion of the microlens array is submerged;

placing a transducer in intimate mechanical contact with a lower surface of the acoustic ink print head substrate, opposite the microlens array; and coupling an energy source across the transducer, wherein energy from the energy source causes oscillations of the transducer to generate ultrasonic waves to be transmitted through the substrate for illumination of at least a portion of the microlens array, which in turn focuses the waves to excite a surface of the pool of ink for emitting an ink drop therefrom.

11. The method according to claim 10 wherein the step of forming the pedestals includes forming pedestals as sharped-edged cylindrical pedestals.

12. The method according to claim 10 wherein the step of depositing further includes providing an amount of photoresist equal to a equilibrium volume, which is an amount of material sufficiently small so that when the melting step takes place, the melted photoresist reaches an equilibrium state while being fully confined by the pedestal edges.

13. The method according to claim 10 wherein the step of forming the pedestals includes forming pedestals which are substantially identical to each other in configuration and size.

14. The method according to claim 10 wherein the step of forming the pedestals includes forming pedestals which are differing from each other from at least one of configuration and size.

15. The method according to claim 10 wherein the step of transferring the geometry of the photoresist mounds into the acoustic ink print head substrate is accomplished by the process of reactive ion etching.

16. The method according to claim 10 wherein the step of forming substrate of the microlens array mold stamper includes using a material having the characteristic of maintaining high heat resistance over a plurality of molding procedures.

17. A method of forming a microlens array mold stamper for use in forming a microlens array, the method comprising the steps of:

forming a substrate material having a plurality of sharp-edged pedestals on an upper surface of the substrate;

depositing predetermined amounts of a photoresist material on the upper surface of each of the pedestals;

melting the photoresist material by a predetermined temperature such that semi-spherical photoresist mounds are formed from the deposited photoresist material; and etching the substrate in accordance with a pattern of the semi-spherical mounds, whereby the geometry of the semi-spherical mounds is transferred into the substrate material thereby forming the microlens array mold stamper.

18. The method according to claim 17 wherein the microlens array mold stamper is further used in the steps of:

pressing the microlens array mold stamper into a top surface of a heated acoustic ink print head substrate to form an array of concave indentations corresponding to the semi-spherical mounds of the microlens array mold stamper; and separating the microlens array mold stamper from the upper surface of the acoustic ink print head substrate, whereby a microlens array is formed in the upper surface of the acoustic ink print head substrate.

19. The method according to claim 18 wherein the step of transferring the geometry of the photoresist mounds into the acoustic ink print head substrate is accomplished by the process of reactive ion etching.

20. The method according to claim 18 wherein the microlens array mold stamper maintains high heat resistance over a plurality of steps of pressing the array mold stamper into the heated acoustic ink printhead substrate.

* * * * *